United States Patent Office 3,822,123
Patented July 2, 1974

3,822,123
HERBICIDAL COMPOSITION AND METHOD UTILIZING SUBSTITUTED AZABICYCLOALKANES
Elmar Sturm, Arlesheim, Basel-Land, and Christian Vogel, Binningen, Basel-Land, Switzerland, assignors to Ciba-Geigy Corporation, Ardsley, N.Y.
No Drawing. Original application July 20, 1970, Ser. No. 56,687, now Patent No. 3,661,916. Divided and this application Jan. 12, 1972, Ser. No. 217,284
Int. Cl. A01n 9/22
U.S. Cl. 71—94                                       14 Claims

ABSTRACT OF THE DISCLOSURE

Compounds of the formula

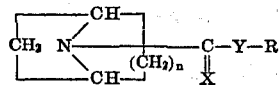

wherein

R represents lower alkyl, lower halogenalkyl, lower alkenyl or lower halogenalkenyl,
n represents the integer 0 or 1 and
of the symbols X and Y, one represents sulphur and the other represents oxygen or sulphur
are disclosed as herbicidally active substances. Compositions as well as a method for controlling weeds and wild grasses with the aid of such compounds are also described.

---

This is a division of application Ser. No. 56,687, filed on July 20, 1970, now U.S. Pat. 3,661,916.

The present invention concerns new substituted azabicycloalkanes, process for the production thereof as well as herbicidal compositions containing such substituted azabicycloalkanes as active ingredients and method for the control of grass-type and broad-leaf weeds using the new active substances or compositions containing them.

Herbicidal polymethyleneimino thiocarbamates and azabicyclononanes have been described in U.S. Pats. Nos. 3,198,786 and 3,344,134; although they have a good selectivity on rice, their effect on wild grasses is slight and dicotyl weeds are not damaged.

It has now been found that new substituted azabicycloalkanes of the Formula I

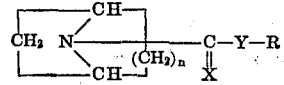   (I)

wherein

R represents lower alkyl, lower halogenalkyl, lower alkenyl or lower halogenalkenyl,
n represents the integer 0 or 1, and
of the symbols X and Y, one represents sulphur and the other represents oxygen or sulphur, possess, with equally good selectivity on rice, much better effectiveness against wild grasses and have a much better range of effectiveness against dicotyl weeds.

The expression "substituted azabicycloalkanes" is used here and in the following for 8-azabicyclo[3.2.1]octane and 9-azabicyclo[3.3.1] nonane, which are substituted at the nitrogen atom in the 8- and 9-positions, respectively, by a modified carboxyl group.

In Formula I, lower alkyl designates straight or branched-chain radicals having from 1 to 6, preferably 1 to 4 carbon atoms, e.g. methyl, ethyl, propyl, isopropyl, n-butyl, sec-butyl, tertbutyl, etc. Lower halogenalkyl designates lower alkyl mono- or poly-substituted by fluorine, chlorine, bromine or iodine. Lower alkenyl intends, in particular, radicals having from 2 to 6, preferably 3 to 4 carbon atoms such as the allyl or methallyl radical, a propenyl or butenyl radical. Lower halogenalkenyl designates lower alkenyl mono- or poly-substituted by fluorine, chlorine, bromine or iodine.

The new substituted azabicycloalkanes of Formula I are produced according to the invention by reacting an azabicycloalkane of the Formula II

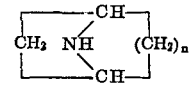   (II)

as such or in the form of an acid addition salt thereof, in the presence of an inorganic or organic base either with a thiocarbonyl halide of the Formula III

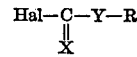   (III)

or with the individual components of such a halide, namely with phosgene or thiophosgene and the alkali-metal salt of an alkanol or mercaptan of the Formula IV

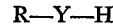   (IV)

In the Formulas II to IV, R, n, Y and X have the meanings given for Formula I, Hal in Formula III represents chlorine or bromine. By the reaction of an azabicycloalkane of Formula II with phosgene or thiophosgene, the halocarbonyl compound obtained as intermediate can be reacted directly without further purification with an alkali salt of an alkanol or mercaptan of Formula IV.

For the production of substituted azabicycloalkanes of Formula I wherein X is oxygen or sulphur and Y represents sulphur, the following modification of the process is preferred: an azabicycloalkane of Formula II is reacted, as such or in the form of one of its acid addition salts, in the presence of an inorganic or organic base with a compound of the formula

CXS wherein X represents oxygen or sulphur and a compound of the Formula V

   (V)

wherein Hal represents chlorine, bromine or iodine.

A preferred process according to the invention for the production of substituted azabicycloalkanes of Formula I wherein X represents sulphur and Y represents oxygen, is the reaction of an azabicycloalkene of Formula II with a xanthogene-acetic acid ester of the Formula VI

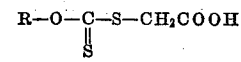   (VI)

in the presence of an inorganic or organic base. The azabicycloalkane of Formula II can be employed in the reaction as such or in the form of one of its acid addition salts.

For the reactions according to the instant invention, azabicycloalkanes of Formula II are employed either as the free base or as an acid addition salt thereof, the hydrohalides such as the hydrochlorides, hydrobromides and hydroiodides, sulphates and hydrogensulphates, phosphates and hydrogenphosphates, carbonates and hydrogencarbonates being best suited. The compounds of Formula II are known and are obtained by known methods by the Wolff-Kishner reduction from the corresponding 3-oxo compounds.

For the reactions according to the instant invention, suitable inorganic bases are hydroxides and carbonates of alkali and alkaline earth metals, in particular sodium hydroxide, potassium hydroxide, sodium carbonate and potassium carbonate, furthermore the hydroxides and carbonates of lithium, barium, strontium and magnesium as well as quaternary ammonium compounds which react in the presence of water as bases, for example tetramethyl ammonium hydroxide, etc. and suitable organic bases are tertiary amines such as trialkyl amines, pyridine and pyridine bases; likewise the azabicycloalkane of Formula II employed in excess can serve to take up the hydrohalide which escapes during the reactions.

It is advisable to perform the reactions according to the invention in solvents or diluents which are inert towards the reaction components. Suitable for this purpose are: aliphatic and aromatic hydrocarbons and halohydrocarbons such as pentane, hexane, benzene, toluene, xylenes, methylene chloride, chloroform, carbontetrachloride; ether and ether-type compounds such as dialkyl ethers, tetrahydrofuran; alcohols such as ethanol; N,N-dialkylated amides and water, as well as mixtures of such solvents with water and two-phase systems of water and solvents which are immiscible or only slightly miscible in water.

The new substituted azabicycloalkanes of Formula I have excellent herbicidal properties and are particularly suitable for the control of glass-type and broad-leaf weeds in various cultivated plantations. Weeds which are difficult to control and deep rooted annual and perennial weeds are damaged in their growth or destroyed successfully by the active substances of the Formula I. They can be applied with equal success before (preemergence) and after emergence (postemergence) of the plants. Thus fields weeds, such as varieties of millet (*Panicum* sp.), varieties of mustard (*Sinapis* sp.), varieties of goose foot (*Chenopodiaceae*), slender foxtail (*Alopecurus* sp.), Amaranthaceae, e.g. amaranthus sp., grasses, e.g. *Lolium* sp., compositae, e.g. *Taraxacum* sp., varieties of chamomile (*Matricaria* sp.), can be destroyed or their growth can be hindered without damaging cultivated plants such as grain, maize, cotton, sugar beet, soyabeans. Furthermore, these active substances are effective against weeds which are difficult to control in rice plantations: for example *Echinochloa* sp., *Eleocharis* sp., *Panicum* sp., *Cyperaceae*, *Paspalum* sp., etc. in water cultivations; and in dry cultivations again *Echinochloa* sp., *Digitaria* sp., *Brachiaria* sp., *Sida* sp., *Cyperaceae*, *Acanthosperum* sp., etc. Since the active substances are, in the usual application concentrations, nontoxic for warm-blooded animals, fish and animals serving as food for fish, and since they gradually destroy the plants and thus do not drastically disturb the oxygen balance and the biological balance; they are very well suited for use in water cultivations. Furthermore the active substances have broad range of effectiveness against a large variety of aquatic weeds, e.g. immersed plants, aquatic plants with and without floating leaves, submersed plants, algae, etc.

The broad range of action of the new substituted azabicycloalkanes of Formula I makes it possible to employ them in the important control of weeds and wild grasses in the areas surrounding the rice plantations such as ditches, canal beds, dams, etc. These active substances destroy not only the wild grasses named, which grow in rice fields, but also other grass-type and broad-leafed weeds. The active substances can also be applied in the preparation of the rice beds and after the emergence of the plants for the destruction of weeds which are already standing. In both water cultivations as well as in dry cultivations, the rice is not damaged by application of the new substituted azabicycloalkanes in the usual application amounts, in higher amounts most of the damage caused is reversible. The application amounts vary and depend upon the time of application; they lie between 0.5 and 6, preferably 4 kg. of active substance per hectare, by preemergence application. Application amounts of from 10 to 30 kg. of active substance per hectare are used for total destruction of all of the standing weeds, for instance on fallow ground adjacent to the cultivated field as well as for the determination of the general herbicidal activity. The use of the new active substances is not detrimental to crop rotation which is important in the cultivation of rice.

In addition such substituted 2-azabicycloalkanes can also be employed as growth regulators, e.g. for defoliation, delay of blossoming, etc.; some of them stimulate the vegetative storage organelles, in some cases simultaneously decreasing the length of growth.

The following non-limitative examples illustrate the production of the new azabicycloalkanes of Formula I. Unless expressly stated otherwise, temperatures are given in degrees centigrade.

EXAMPLE 1

120 g. of 8-azabicyclo[3.2.1]octane hydrochloride are dissolved in 200 ml. of water and 100 ml. of ethanol, and a solution of 65 g. of sodium hydroxide in 150 ml. of water is added thereto. The mixture is cooled to 0–5° and at this temperature, 62 g. of carbon disulfide ar slowly added dropwise. After completion of the addition, the mixture is stirred for one hour at 5–10° and then at the same temperature 63 g. of allyl chloride are added dropwise thereto. After stirring for 10 hours at room temperature, the oil which has formed is taken up in methylene chloride. The methylene chloride is removed by distillation in vacuum. The brown residual oil is purified by distillation in vacuum (b.p. 106–110°/0.005) and crystallized. 145 g. of 8-(allylthio-thiocarbonyl) - 8 - azabicyclo-[3.2.1]octane, m.p. 48–49°, are obtained.

EXAMPLE 2

A solution of 45 g. of 9-azabicyclo[3.3.1]nonane hydrochloride in 200 ml. of water is added to a solution of 30 g. of sodium hydroxide in 300 ml. of water, and covered with a layer of 500 ml. of petroleum ether. With vigorous stirring and cooling to 0–5°, 42 g. of ethyl thiolchloroformate are added dropwise to the mixture. After completion of the addition, stirring is continued for one hour at room temperature and the phases are separated. The aqueous phase is extracted with petroleum ether, the petroleum ether extracts are washed with dilute hydrochloric acid and then with water. After drying and evaporation of the solvent, a yellowish oil is obtained which is distilled in vacuum. The 9-(ethylthio-carbonyl)-9-azabicyclo[3.3.1]nonane has a boiling point of 102–104° at 0.2 torr.

EXAMPLE 3

A solution of 41 g. of 9-azabicyclo[3.3.1]nonane hydrochloride in 200 ml. of water and 100 ml. of ethanol is treated with an aqueous solution of 45 g. of ethylxanthogene-acetic acid and an aqueous solution of 20 g. of sodium hydroxide and then stirred for 48 hours at normal temperature. The alcohol is removed by distillation in vacuum and the residue is taken up in methylene chloride. The methylene chloride solution is washed with dilute hydrochloric acid, afterwards with water and then dried. After removal of the solvent, 35 g. of a brownish oil are obtained, which crystallizes after distillation. The 9-(ethoxy-thiocarbonyl)-9-azabicyclo[3.3.1]nonane has a melting point of 38–43°.

EXAMPLE 4

6 g. of carbon oxysulfide are bubbled during 2 hours at a temperature of 0–5° in a solution of 11.8 g. of 8-azabicyclo[3.2.1]octane-hydrochloride and 6.4 g. sodium hydroxide in 200 ml. of water. After completion of the addition, stirring is continued for one hour at 5 to 10° and 7.6 g. of allylchloride are added to the clear solution. The reaction mixture is allowed to stay for 15 hours at room temperature. The oil formed is extracted with diethyl ether, the ether extract is washed neutral and dried and the ether is evaporated in vacuum. The greenish oil obtained is distilled in vacuum and 12 g. of 8-(allylthiocarbonyl)-8-azabicyclo[3.2.1]octane are obtained in a colorles oil, b.p. 90–94°/0.01 torr.

The following active substances of Formula I were also produced according to the methods described in the previous examples:

| No. | Compounds | Physical data |
|---|---|---|
| 5 | 9-(methylthio-thiocarbonyl)-9-azabicyclo[3.3.1]nonane. | M.P. 109–110°. |
| 6 | 9-(ethylthio-thiocarbonyl)-9-azabicyclo[3.3.1]nonane. | M.P. 76–77°. |
| 7 | 9-(n-propylthio-thiocarbonyl)-9-azabicyclo[3.3.1]nonane. | M.P. 55–59°. |
| 8 | 9-(isopropylthio-thiocarbonyl)-9-azabicyclo[3.3.1]nonane. | M.P. 57–58°. |
| 9 | 9-(n-butylthio-thiocarbonyl)-9-azabicyclo[3.3.1]nonane. | $n_D^{20}=1.5828$. |
| 10 | 9-(allylthio-thiocarbonyl)-9-azabicyclo[3.3.1]nonane. | M.P. 43–45°. |
| 11 | 9-(methallylthio-thiocarbonyl)-9-azabicyclo[3.3.1]nonane. | B.P. 132°/0.01 torr. |
| 12 | 9-(2'-chlorallylthio-thiocarbonyl)-9-azabicyclo[3.3.1]nonane. | M.P. 98–99°. |
| 13 | 9-(cis-3'-chlorallylthio-thiocarbonyl)-9-azabicyclo[3.3.1]nonane. | B.P. 120°/0.001 torr. |
| 14 | 9-(methylthio-carbonyl)-9-azabicyclo[3.3.1]nonane. | M.P. 58–59°. |
| 15 | 9-(isopropylthio-carbonyl)-9-azabicyclo[3.3.1]nonane. | B.P. 85–87°/0.07 torr. |
| 16 | 9-(n-propylthio-carbonyl)-9-azabicyclo[3.3.1]nonane. | B.P. 88–90°/0.01 torr. |
| 17 | 9-(sec-butylthio-carbonyl)-9-azabicyclo[3.3.1]nonane. | B.P. 124–127°/1 torr. |
| 18 | 9-(allylthio-carbonyl)-9-azabicyclo[3.3.1]nonane. | $n_D^{20}=1.5471$. |
| 19 | 9-(methoxy-thiocarbonyl)-9-azabicyclo[3.3.1]nonane. | M.P. 62–63°. |
| 20 | 9-(isopropoxy-thiocarbonyl)-9-azabicyclo[3.3.1]nonane. | M.P. 48–49°. |
| 21 | 8-(methylthio-thiocarbonyl)-8-azabicyclo[3.2.1]octane. | M.P. 104–107°. |
| 22 | 8-(ethylthio-thiocarbonyl)-8-azabicyclo[3.2.1]octane. | M.P. 54–56°. |
| 23 | 8-(trans-2'-butenylthio-thiocarbonyl)-8-azabicyclo[3.2.1]octane. | $n_D^{22}=1.6085$. |
| 24 | 8-(2'-chlorallylthio-thiocarbonyl)-8-azabicyclo[3.2.1]octane. | M.P. 64–66°. |
| 25 | 8-(ethylthio-carbonyl)-8-azabicyclo[3.2.1]octane. | $n_D^{20}=1.5339$. |
| 26 | 8-(propylthio-carbonyl)-8-azabicyclo[3.2.1]octane. | B.P. 69–71°/0.2 torr. |
| 27 | 8-(n-butylthio-carbonyl)-8-azabicyclo[3.2.1]octane. | $n_D^{20}=1.5240$. |
| 28 | 8-(tert-butylthio-carbonyl)-8-azabicyclo[3.2.1]octane. | B.P. 88–90°/0.05 torr. |
| 29 | 8-(2'-chlorallylthio-carbonyl)-8-azabicyclo[3.2.1]octane. | B.P. 110–120°/0.001 torr. |
| 30 | 8-(3'-chloropropylthio-carbonyl)-8-azabicyclo[3.2.1]octane. | |
| 31 | 9-(3'-chloropropylthio-carbonyl)-9-azabicyclo[3.3.1]nonane. | |

The herbicidal effect of the new compounds is illustrated by the following tests:

(I) PREEMERGENCE TEST

The active substance, in the form of a 10% powder concentrate is mixed into soil in a concentration of 30 kg. per hectare. Seed trays are filled with this prepared soil and the following test plants are sown therein: millet (*Setaria italica*), mustard (*Sinapis alba*), oats (*Avena sativa*), rye grass (*Lolium perenne*) and vetch (*Vicia sativa*).

The trays were then kept in daylight in a greenhouse at 20 to 24° C. and 70% relative humidity.

The test plants were evaluated after 20 days and expressed according to the following scale:

9 = plants undamaged = control,
1 = plants dead,
8–2 = intermediate degrees of damage.

TABLE I

| Active substance number | Millet (*Setaria italica*) | Mustard (*Sinapis alba*) | Oats (*Avena sativa*) | Rye grass (*Lolium perenne*) | Vetch (*Vicia sativa*) |
|---|---|---|---|---|---|
| 1 |   | 1 | 1 | 1 | 2 |
| 2 | 1 | 2 | 1 | 1 | 2 |
| 3 | 4 | 3 | 4 | 3 | 4 |
| 4 | 1 | 3 | 1 | 2 | 2 |
| 5 |   | 5 | 2 | 2 | 4 |
| 6 |   | 4 | 2 | 2 | 3 |
| 7 | 2 | 7 | 2 | 3 | 8 |
| 10 | 1 | 2 | 2 | 1 | 2 |
| 11 |   | 1 | 2 | 1 | 2 |
| 14 | 1 | 3 | 2 | 2 | 2 |
| 17 | 2 | 3 | 2 | 2 | 7 |
| 18 | 2 | 3 | 2 | 2 | 2 |
| 19 | 4 | 2 | 4 | 3 | 2 |
| 21 | 2 | 4 | 2 | 2 | 2 |
| 22 | 1 | 3 | 1 | 1 | 3 |
| 23 | 2 | 4 | 4 | 1 | 6 |
| 24 | 3 | 2 | 4 | 1 | 2 |
| 25 | 1 | 3 | 1 | 1 | 1 |
| 26 | 1 | 2 | 1 | 1 | 2 |
| 27 | 2 | 3 | 2 | 1 | 3 |
| 28 | 2 | 3 | 1 | 2 | 7 |
| 29 | 2 | 3 | 2 | 1 | 3 |

The 10% powder concentrate has the following composition: 10 parts of active ingredient, 0.6 parts of sodium dibutyl-naphthalene-sulfonate, 1 part of naphthalene-sulfonic acid/phenol-sulfonic acid/formaldehyde condensation product (3:2:1), 10 parts of sodium aluminium silicate, and 78.4 parts of kaolin.

(II) SELECTIVE PREEMERGENCE TEST WITH TEST PLANTS GROWN FROM SEED

Directly after sowing the test plants in seed trays, the active substances are applied to the surface of the soil as aqueous suspension, obtained from a 25% wettable powder. The seed trays are then kept in daylight at 22–25° and 50–70% relative humidity.

They were evaluated after 28 days according to the scale mentioned under I. The following test plants were sown:

rice, dry: (*Oryza oryzoides*)
rice, in water
wheat: (*Tritium vulgare*)
rice, in water wheat: (*Tritium vulgare*)
soyabean: (*Glicine hyspida*)
cotton: (*Gossypium herbaccara*)
Italian rye grass: (*Lolium multiflorum*)
millet: (*Setaria italica*)
millet in rice, dry: (*Echinochloa crus galli*)
millet in rice, in water
Italian millet: (*Panicum italicum*)

TABLE II.—SELECTIVITY TESTS, GROWTH OF THE SEEDED PLANTS AFTER 4 WEEKS

| Active substance Example number | Conc., kg./ha. | Crop | | | | | Weeds/wild grasses | | | | |
| | | Rice, dry | Rice in water | Soyabean | Wheat | Cotton | Lolium multiflorum | Seteria italica | Echinochloa crus galli | | Panicum italicum |
| | | | | | | | | | Dry | In water | |
|---|---|---|---|---|---|---|---|---|---|---|---|
| 1 | 4 |   | 2 | 7 | 7 |   | 1 | 1 |   |   |   |
|   | 2 |   | 8 | 8 | 9 |   | 2 | 2 |   |   |   |
|   | 1 |   | 8 | 9 | 9 |   | 3 | 4 |   |   |   |
| 2 | 4 |   | 8 | 7 | 6 | 9 | 2 | 2 |   | 1 |   |
|   | 2 |   | 8 | 8 | 9 | 9 | 3 | 3 |   | 2 |   |
|   | 1 |   | 9 | 8 | 9 | 9 | 7 | 7 |   | 7 |   |
| 5 | 4 |   | 9 | 9 | 9 | 9 | 7 | 2 |   |   |   |
|   | 2 |   | 9 | 9 | 9 | 9 | 7 | 3 |   |   |   |
|   | 1 |   | 9 | 9 | 9 | 9 | 8 | 4 |   |   |   |
| 10 | 4 | 4 |   | 9 | 7 | 9 | 3 |   | 1 |   | 3 |
|   | 2 | 7 |   | 9 | 8 | 9 | 3 |   | 2 |   | 3 |
|   | 1 | 9 |   | 9 | 9 | 9 | 3 |   | 2 |   | 3 |
| 14 | 4 | 8 | 9 | 9 |   | 9 |   | 2 | 2 |   | 1 |
|   | 2 | 8 | 9 | 9 |   | 9 |   | 4 | 2 |   | 2 |
|   | 1 | 8 | 9 | 9 |   | 9 |   | 6 | 3 |   | 3 |

TABLE II—Continued

| Active substance Example number | Conc.; kg./ha. | Crop ||||| Weeds/wild grasses |||||
|---|---|---|---|---|---|---|---|---|---|---|---|
| | | Rice, dry | Rice in water | Soya-bean | Wheat | Cotton | Lolium multi-florum | Seteria italica | Echinochloa crus galli || Panicum italicum |
| | | | | | | | | | Dry | In water | |
| 17 | 4 | 7 | 9 | 9 | | | | 3 | 3 | 2 | |
| | 2 | 9 | 9 | 9 | | | | 3 | 3 | 3 | |
| | 1 | 9 | 9 | 9 | | | | 3 | 4 | 7 | |
| A [1] | 4 | 6 | 7 | | | | | | 2 | 1 | |
| | 2 | 6 | 8 | | | | | | 4 | 4 | |
| | 1 | 9 | 9 | | | | | | 9 | 9 | |
| B [2] | 4 | 9 | 9 | 9 | 4 | 8 | 3 | 3 | 1 | 1 | |
| | 2 | 9 | 9 | 9 | 9 | 9 | 7 | 8 | 2 | 7 | |
| | 1 | 9 | 9 | 9 | 9 | 9 | 7 | 9 | 4 | 9 | |
| C [3] | 4 | 9 | 9 | 9 | 9 | 9 | 3 | 3 | 3 | 1 | |
| | 2 | 9 | 9 | 9 | 9 | 9 | 9 | 4 | 6 | 7 | |
| | 1 | 9 | 9 | 9 | 9 | 9 | 9 | 9 | 7 | 9 | |

[1] 1-(ethylthio-carbonyl)-hexamethyleneimine (known from U.S. Patent No. 3,198,786).
[2] 1-(isopropylthio-carbonyl)-hexamethyleneimine (known from U.S. Patent No. 3,198,786).
[3] 3-(ethylthio-carbonyl-3-azabicyclo[3.2.2]-nonane (known from U.S. Patent No. 3,344,134).

To produce herbicidal agents, the active substances are mixed with suitable carriers and/or distributing agents. To broaden the range of action, other herbicides may be admixed with these agents, for example from the triazine series such as halogeno-diamino-s-triazines, and alkoxy- and alkylthio-diamino-s-triazines, triazoles, diazines such as uracils, aliphatic carboxylic and halogenocarboxylic acids, halogenated benzoic acids and phenylacetic acids, aryloxyalkane carboxylic acids, hydrazides, amines, nitriles, esters of such carboxylic acids, carbamic and thiocarbamic acid esters, ureas, etc.

The production of herbicidal compositions according to the invention is performed in a known manner by intimate mixing and grinding of active substances of the general Formula I together with suitable carriers, optionally with the addition of dispersing agents or solvents, which are inert towards the active substances. The active substances can be used and applied as dusts, scattering agents, granulates, coated granulates, impregnated granulates, homogenous granulates, wettable powders, pastes, emulsions or solutions.

For the production of solid preparations (dusts scattering agents, granulates) the active ingredients are mixed with solid carriers. Examples of suitable solid carriers are kaolin, talcum, bole, loess, chalk, limestone, ground limestone, Ataclay, dolomite, diatomaceous earth, precipitated silica acid, alkaline earth silicates (fieldspar and mica), calcium and magnesium sulfates, magnesium oxide, ground synthetic plastics, fertilizers such as ammonium sulfate, ammonium phosphates, ammonium nitrate, ureas, ground vegetable products such as bran, bark dust, sawdust, ground nutshells, cellulose powder, residues of plant extractions, active charcoal, etc. These carriers can be used alone or admixed with each other. The particle size of the carriers is, for dusts advantageously up to about 0.1 mm., for scattering agents from about 0.075 to 0.2 mm., and for granulates 0.2 mm. or more. The concentrations of active substance in the solid preparations are from 0.5 to 80%.

To these mixtures can also be added additives which stabilize the active substance and/or non-ionic, anionic and cationic surface active substances which, for example, improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 1 to 15 ethylene oxide radicals per molecule and 8 to 9 carbon atoms in the alkyl moiety, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, and also latex products.

The water-dispersible concentrates of the active substance, i.e. wettable powders, pastes and emulsion concentrates, are compositions which can be diluted with water to any concentration desired. They consist of active substance, carrier, optionally additives which stabilize the active substance, surface-active substances and anti-foam agents and, optionally, solvents. The concentration of active substance in these agents is 5 to 80%.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are so mixed, ground, sieved and and strained with the additives mentioned above that, in wettable powders, the solid particle size of from 0.02 to 0.04 and in pastes, of 0.03 is not exceeded. To produce emulsion concentrates and pastes, dispersing agents such as those given in the prevous paragraphs, organic solvents and water are used. Examples of suitable solvents are the following: alcohols, benzene, xylenes, toluene, dimethyl sulfoxide, and mineral oil fractions boiling between 120 and 350° C. The solvents must be practically ordorless, not phytotoxic, inert to the active substances and not readily inflamable.

Furthermore, the compositions according to the invention can be applied in the form of solutions. For this purpose the active substance or several active substances of general Formula I are dissolved in suitable organic solvents, mixtures of solvents or in water. Aliphatic and aromatic hydrocarbons, chlorinated derivatives thereof, alkyl naphthalenes and mineral oils, alone or mixed with each other, can be used as organic solvents. The solution should contain the active substances in a concentration of from 1 to 20%.

The compositions described according to the invention can be mixed with other biocidally active compounds or agents. Thus, to broaden the range of action, the new agents can contain, e.g. insecticides, fungicides, bactericides, fungistatics, bacteriostatics or nematocides in addition to the compounds mentioned of the general Formula I. The compositions according to the invention can also contain plant fertilizers, trace elements, etc.

In the following, application forms of the new azabicycloalkanes of Formula I are described. "Parts" mean parts by weight.

Granulate

The following ingredients are used to produce a 5% granulate:

5 parts of 9 - (methylthio-thiocarbonyl) - 9 - azabicyclo-[3.3.1]nonane,
0.25 part of epichlorohydrin,
0.25 part of cetyly polyglycol ether,
3.50 parts of polyethylene glycol ("Carbowax"),
91 parts of kaolin (granular size 0.3–0.8 mm.).

The active ingredient is mixed with epichlorohydrin and dissolved with 6 parts of acetone; then the polyethylene glycol and cetyl polyglycol ether are added. The resulting solution is sprayed onto kaolin and then evaporated in vacuum. Such granulates can be employed for the control of weeds in water rice cultivations.

Wettable powder

The following components are used for the preparation of (a) 50%, (b) 25% and (c) 10% wettable powders:

(a)

50 parts of 9-(methylthio-thiocarbonyl) - 9 - azabicyclo-[3.3.1]nonane,
5 parts of soduim dibutylnaphthyl sulfonate,
3 parts of naphthalene sulfonic acid/phenol sulfonic acid/formaldehyde condensation products 3:2:1,
20 parts of kaolin,
22 parts of Champagne chalk;

(b)

25 parts of 9 - (allylthio-thiocarbonyl) - 9 - azabicyclo-[3.3.1]nonane,
5 parts of the sodium salt of oleylmethyl tauride,
2.5 parts of naphthalene sulfonic acid/formaldehyne condensation product,
0.5 part of carboxymethyl cellulose,
5 parts of neutral potassium aluminum silicate,
62 parts of kaolin;

(c)

10 parts of 9 - (methylthio-thiocarbonyl)-9-azabicyclo-[3.3.1]nonane,
3 parts of mixture of sodium salts of saturated fatty alcohol sulfates,
5 parts of naphthalene sulfonic acid/formaldehyde condensation product,
82 parts of kaolin.

The given active ingredient is absorbed onto the corresponding carriers (kaolin and chalk) and then mixed and ground. Wettable powders having excellent wettability and suspensibility are obtained. By dilution with water, suspensions of any desired concentration of the active ingredients can be obtained from such wettable powders. Such suspensions are used for the control of weeds and wild grasses before and after emergence of the cultivated plants, for example rice.

Paste

The following ingredients are used for the preparation of a 45% paste:

45 parts of 9-(methylthio-thiocarbonyl)-9-azabicyclo [3.3.1]nonane,
5 parts of sodium aluminum silicate,
14 parts of cetyl polyglycol ether,
1 part of oleyl polyglycol ether,
2 parts of spindle oil,
10 parts of polyethylene glycol,
23 parts of water.

The active ingredient is intimately mixed and ground in suitable equipment with the additives. A paste is obtained which can be diluted with water to prepare suspensions of any desired concentration. The suspensions are suitable, for example, for the treatment of grain and maize plantations before and after the emergence of the cultivated plants.

Emulsion concentrate

To prepare a 10% emulsion concentrate 10 parts of 9 - (methylthio - thiocarbonyl)-9-azabicyclo [3.3.1]nonane,
15 parts of oleyl polyglycol ether having 8 mol of ethylene oxide, and
75 parts of isophorone are mixed together. This concentrate can be diluted with water to emulsions of suitable concentrations. Such emulsions are employed for the control of weeds in cultivated plantations such as cotton, etc.

We claim:
1. A herbicidal composition which comprises as herbicidally active substance an effective amount of a compound of the formula

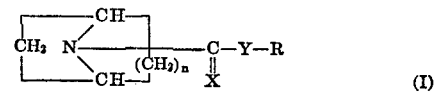

(I)

wherein

R represents lower alkyl, lower chloroalkyl, lower alkenyl or lower chloroalkenyl,
n represents the integer 0 or 1, and
of the symbols X and Y, one represents sulphur and the other represents oxygen or sulphur,
and an agriculturally acceptable inert carrier.

2. A composition according to Claim 1, which comprises 8 - (allylthio-thiocarbonyl)-8-azabicyclo[3.2.1]octane as active substance.

3. A composition according to Claim 1, which comprises 9 - (methylthio - carbonyl)-9-azabicyclo[3.2.1]nonane as active substance.

4. A composition according to Claim 1, which comprises 9 - (ethylthio - carbonyl)-9-azabicyclo[3.3.1]nonane as active substance.

5. A composition according to Claim 1, which comprises 9 - (sec - butylthio-carbonyl)-9-azabicyclo[3.3.1]nonane as active substance.

6. A composition according to Claim 1, which comprises 9 - (methylthio - thiocarbonyl)-9-azabicyclo[3.3.1]nonane as active substance.

7. A composition according to Claim 1, which comprises 9 - (allylthio - thiocarbonyl)-9-azabicyclo[3.3.1]nonane as active substance.

8. A method for controlling unwanted weeds which comprises applying to the locus thereof a herbicidally effective amount of a compound of the formula

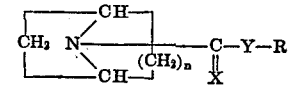

wherein

R represents lower alkyl, lower chloroalkyl, lower alkenyl or lower chloroalkenyl,
n represents the integer 0 or 1, and of the symbols X and Y, one represents sulphur and the other represents oxygen or sulphur.

9. A method according to Claim 8 in which the compound is 8 - (allylthiothiocarbonyl)-8-azabicyclo[3.2.1]octane.

10. A method according to Claim 8 in which the compound is 9 - (methylthiocarbonyl)-9-azabicyclo[3.3.1]nonane.

11. A method according to Claim 8 in which the compound is 9 - (ethylthiocarbonyl)-9-azabicyclo[3.3.1]nonane.

12. A method according to Claim 8 in which the compound is 9 - (sec-butylthio-carbonyl)-9-azabicyclo[3.3.1]nonane.

13. A method according to Claim 8 in which the compound is 9 - (methylthiothiocarbonyl)-9-azabicyclo[3.3.1]nonane.

14. A method according to Claim 8 in which the compound is 9 - (allylthiothiocarbonyl)-9-azabicyclo[3.3.1]nonane.

References Cited
UNITED STATES PATENTS

| 3,343,942 | 9/1967 | D'Amico | 71—88 |
| 3,639,404 | 2/1972 | Richter et al. | 71—94 |
| 3,066,020 | 11/1962 | Tilles et al. | 71—94 |

GLENNON H. HOLLRAH, Primary Examiner

U.S. Cl. X.R.

71—66, 67, 74, 76